(12) United States Patent
Stamp

(10) Patent No.: US 6,609,331 B1  
(45) Date of Patent: Aug. 26, 2003

(54) PLANT AND MUSHROOM GROWTH MEDIUM

(76) Inventor: John Wesley Stamp, 16 Daintree Close, Forest Gardens, Qld (AU)

( * ) Notice: Subject to any disclaimer, the term of this patent is extended or adjusted under 35 U.S.C. 154(b) by 0 days.

(21) Appl. No.: 09/786,497

(22) PCT Filed: Sep. 6, 1999

(86) PCT No.: PCT/AU99/00730

§ 371 (c)(1),
(2), (4) Date: Mar. 2, 2001

(87) PCT Pub. No.: WO00/14030

PCT Pub. Date: Mar. 16, 2000

(30) Foreign Application Priority Data

Sep. 4, 1998 (AU) .............................................. PP5695
Jun. 16, 1999 (AU) .............................................. PQ0998

(51) Int. Cl.$^7$ ........................... A01G 1/04; C09K 17/00
(52) U.S. Cl. ................................ 47/1.1; 47/63; 47/59.5
(58) Field of Search ............................. 47/1.1, 9, 595, 47/63, 64, 21

(56) References Cited

U.S. PATENT DOCUMENTS

| | | | | |
|---|---|---|---|---|
| 1,876,522 A | * | 9/1932 | Vazquez | 162/16 |
| 3,102,364 A | * | 9/1963 | Pullen | 47/74 |
| 3,163,517 A | * | 12/1964 | May | 71/1 |
| 4,237,582 A | * | 12/1980 | Villavicencio | |
| 4,304,361 A | * | 12/1981 | Campbell | 241/24.21 |
| 5,106,648 A | * | 4/1992 | Williams | 424/93.4 |
| 5,173,122 A | * | 12/1992 | Tilby et al. | 127/2 |

OTHER PUBLICATIONS

Soltanzad et al. 1982. Effects of Various Soil Mixtures on Growth of Chysanthemun morifolium. Journal Rio Grande Valley Horticultural Society 35: 43.–45.*

SNT International File CABA, Abstract No. 91:23696, "Growth of Dieffenbachia and Gardenia in various potting ingredients", R.T. Poole et al. & Proceedings of the Florida State Horticultural Society, (1989), vol. 102, pp. 286–288. See abstract.

SNT International File CABA, Abstract No. 82:14101, "Effects of various soil mixtures on growth of Chrysanthemum morifolium", I. Soltanzad et al. & Journal of the Rio Grande Valley Horticultural Society, (1982), vol. 35, pp. 43–45. See abstract.

SNT International File CABA, Abstract No. 80:14183, "Soil mixtures for citrus seedlings" & Information Bulletin, Citrus ad Subtropical Fruit Research Institute, (1979) No. 79, pp. 12–13. See abstract.

SNT International File CABA, Abstract No. 1998: 131653, "Waste t wealth—through sugar industry", S.R. Mala et al. & Cooperative Sugar, (1998), 29(9), pp. 623–624. See Abstract.

STN International File CABA, Abstract No. 95:122072 M. Betanees et al. & Bletin F.D.A. (1994) vol. 7, No. 1, pp. 6–7. See abstract.

STN International File CABA, Abstract No. 88:126226, P. Guzman et al. "Substrates for technified nursery beds. Study on surface layers" & Ciencia y Tecnica en la Agricultura, Tabaco, (1987), 10(2), pp. 71–82. See abstract.

STN International File HCA, Abstract No. 95:131581, "Sugar beet lime waste" & Mushroom J., 1981, 104, 265. See abstract.

STN International File CABA, Abstract No. 81:27108, A.D. Clift et al, "occurrence of paedogenetic cecidomyiids in casing layer materials used in the Australian mushroom industry" & General and Applied Entomology, 1980, 12, 49–50. See abstract.

* cited by examiner

Primary Examiner—Peter M. Poon
Assistant Examiner—Jeffrey L. Gellner
(74) Attorney, Agent, or Firm—Cantor Colburn LLP

(57) ABSTRACT

A growth medium for plants or mushrooms, the medium comprising sugar care mill mud and non sphagnum-peat material selected from the group consisting of a non-sphagnum-peat and coconut fibre.

4 Claims, No Drawings

PLANT AND MUSHROOM GROWTH MEDIUM

FIELD OF THE INVENTION

The present invention is directed towards a growth medium for plants. The present invention is also directed towards a growth medium for use as a casing soil in mushroom cultivation.

BACKGROUND ART

In commercial mushroom cultivation it is general practice to provide a lower layer of compost which is covered by a layer of a material referred to as casing soil. It is important in mushroom cultivation that the casing soil assists in maintaining a desirable moisture level for mushroom growth. It should also maintain a desirable carbon dioxide and oxygen ratio. Further the casing soil should maintain the nutrient balance of the compost and also act as a barrier to disease and insect pests.

To date, the only material which has been recognised by commercial mushroom growers as being acceptable for use as casing material is sphagnum peat. Sphagnum peat is partially decomposed sphagnum moss and is obtained from Ireland, Holland and Canada (known as blonde peat). Sphagnum peat has the required ability to retain moisture at levels suitable for mushroom growth, together with required porosity and nutrient levels.

However, existing sphagnum peat supplies are becoming depleted. Thus, there is a need in the industry for an alternative to sphagnum peat. Still further, the costs of obtaining imported sphagnum peat are high and adds considerably to a mushroom grower's costs. Thus, there is a further need in the industry for an economically viable alternative to sphagnum peat.

A difficulty with obtaining an alternative to sphagnum peat is that any alternative must satisfy the particular requirements for mushroom cultivation. As mentioned above, a casing soil must have a moisture holding capacity to ensure that there is sufficient moisture to support mushroom growth Other important properties include neutral pH, low salt levels and suitable nutrient levels. It has been observed that although other types of peat such as sedge peat are available they do not satisfy the above requirements and are unsuitable as casing soils. To date, there is no commercially available alternative to sphagnum peat.

In the horticultural industry, it is common practice to prepare artificial growth medium for use as potting mixes. Such growth media must have desirable air porosity, water retention properties and sufficient nutrients to sustain plant growth.

Typical commercial potting mixes include a mixture of coarse sand and an organic material. Such a mixture on its own is generally deficient in many nutrients necessary for plant growth. Thus, to provide a satisfactory mix, it is necessary to add the nutrients required for plant growth.

Typical organic materials are timber products such as bark chips and composted bark material. Although these materials are generally obtained from byproducts of timer production, their supply does rely on diminishing natural resources.

In an attempt to provide a plant growth medium with desirable properties a number of different combinations of material have been researched. Examples of these earlier studies include the use of filler materials such as bagasse, coconut fibre and rice husks with sphagnum peat moss and sphagnum peat.

Filler materials such as bagasse are fibrous materials which contain no significant levels of nutrients. Thus, it is necessary to add the nutrient rich sphagnum moss or peat. However, as mentioned above, sphagnum peat is in a finite supply. To date, it is believed there is no acceptable alternative to the use of sphagnum peat in the horticulture or mushroom industries.

It is therefore an object of the present invention to provide a growth medium for plants and mushrooms which may at least partially overcome the above disadvantages or provide the public with a useful choice. It is also an object of the present invention to provide a material for use as a casing soil which may be used as an alternative to sphagnum peat

SUMMARY OF THE INVENTION

According to a first broad form of the invention there is provided a growth medium for plants or mushrooms, the medium comprising sugarcane mill mud and a non-sphagnum peat material selected from the group consisting of a non-sphagnum peat and coconut fibre.

The growth medium of the present invention may be used in a wide range of applications including potting mixes, soil additive, mulch, mushroom casing soil and also as a top dressing material for germination of grass seeds.

In the present specification and claims, the term "non-sphagnum peat" includes any peat material which is not derived from sphagnum moss. Such peat materials include peat derived from sedges or trees. Another suitable material is coconut fibre, which is known as coco peat. Typically, coco peat consists of shredded coconut coir (the fibrous part of a coconut shell). The coconut fibre may be either partially composted or used in its raw state. Combinations of any two or more types of peat and/or coconut fibre may also be used. Sphagnum peat may also be included as a minor component of the composition if desired.

The term "sugarcane mill mud" in the present specification and claims refers to washing material from sugar cane mills. The washings include cane washings, lime, cane juice impurities and fine bagasse.

Neither non sphagnum-peat materials or sugarcane mill mud when used exclusively as a plant growth medium or casing soil are suitable for satisfactory plant or mushroom growth. However, the present inventor has surprisingly discovered that when a sugarcane mill mud and non-sphagnum peat are used in combination, a material suitable for use as a plant growth medium or casing soil may be obtained.

Neither product on its own is suitable for satisfactorily supporting plant or mushroom growth.

The ratio of non sphagnum-peat material to sugarcane mill mud is typically between about 1.4:1 to about 2:1 parts by weight. Preferably the ratio is about 1.7:1. The amount may vary depending upon the type of peat and source of the sugarcane mill mud. For example, the composition of the sugar cane mill mud may vary, depending upon the source mill.

Typically, the respective amounts of sugar cane mill mud and non sphagnum-peat material component are selected so as to optimise desirable properties such as water retention, aeration, pH, salt content and nutrient level. For example, non sphagnum-peat materials typically have undesirable properties such as low pH, low nutrient levels and low air porosity. These properties may be offset by the sugarcane mill mud which has near neutral pH, suitable nutrient levels and good air porosity. Conversely, undesirable properties of the sugarcane mill mud such as high salt levels, low moisture retention, high levels or susceptibility to unwanted biological organisms are offset by the non sphagnum-peat material which was as low salt levels, good moisture retention and is substantially free of nematodes and other soil pathogene.

Preferably, the non sphagnum-peat material sugarcane mill mud are mixed to provide a composition having the ranges as defined in the following Table 1.

TABLE 1

| Nutrient | Range |
| --- | --- |
| Air Filled Porosity % | 17–25 |
| Water Holding Capacity % | 67–74 |
| pH | 6.7–7.2 |
| Electrical Conductivity | 0.3–0.45 |
| Chloride (ppm) | 18–30 |
| Nitrate Nitrogen (ppm) | 100–150 |
| Ammonium Nitrogen (ppm) | <50 |
| Total Nitrogen (ppm) | 60–100 |
| Sulphur (ppm) | 25–50 |
| Phosphorus (ppm) | 18–40 |
| Potassium (ppm) | 16–30 |
| Calcium (ppm) | 150–350 |
| Magnesium (ppm) | 30–60 |
| Sodium (ppm) | 5–20 |
| Iron (ppm) | 25–50 |
| Copper (ppm) | 1.0–4.5 |
| Manganese (ppm) | 2–7 |

When used as a casing soil composition, preferably water is also added to the peat and/or coconut fibre sugarcane mill mud mixture to provide a water content of between about 65–75% (wt/vol). Typically, the casing soil composition is sterilised prior to use. Other optional additives may also be added. Such additives include wetting agents, fungicides, nematicides, insecticides and texture and pH controlling agents. Such additives are known to those skilled in the art. The composition may also be supplemented with nutrients, if desired, such that the concentrations of the respective chemicals fall within the ranges in Table 1.

Where the medium is to be used as a plant growth medium such as potting mix or top dressing soil, it ma be desirable to add a filler material to modify porosity and/or water retention. The amount of filler can be varied, depending upon the desired properties of the mix. This can depend on the type of plant to be grown. Suitably, about 30 to about 80 wt % of filler may be added. Potting mixes will typically include about 60 to about 70 wt % filler where top dressing soils can contain lower levels of filler.

A preferred filler is an inert material. An especially preferred filler is bagasse.

Optionally, further additions known in the art may be added to the medium of the present invention. Such additives include wetting agents, insecticides, nematicides, nutrients and a pH modifying agent.

BEST MODE

By way of Example only, the present invention will be described with reference to the following Examples.

EXAMPLE 1

A 10 tonne bath of casing soil was prepared as follows: Sugarcane mill mud having a composition according to Table 3 and sedge peat having a composition according to Table 2 are sterilized separately at 70° C. for 5 hours. 6,250 kg of peat and 3,750 kg of sugarcane mill mud are mixed in a mixer. An effective amount of a pH controlling agent such as gypsum and/or lime is added such that the pH of the mixture is near neutral, typically between about 6.7 to about 7.2. Generally about 100–130 kg of the pH controlling agent is added.

A 10L solution of one or more fungicides is prepared. Preferred fungicides are those available under the trade names Prochloraz and Benomyl. Preferably a 10L solution of Prochloraz (0.4–0.8 kg) and Benomyl (0.3–0.7 kg) is prepared.

A 10L solution of an insecticide, nematicide and disinfectant is also prepared. A preferred insecticide is available under the trade name Fipronil (0.2–0.4L), a preferred nematicide is available under the trade name Fenamiphos (0.1–0.3L) and a preferred disinfectant is Formalin (1.5 2.25).

The moisture level of the mix is measured and the amount of water required to achieve a moisture content of about 75% is calculated.

A wetting agent is then added to the calculated amount of water. A preferred wetting agent is Alcohol Ethoxylate. Typically about 0.8–1.5L of ethoxylate is added to about 0.8–1.0KL of water.

The sugarcane mill mud and peat are mixed in the mixer at a speed not more than about 50 rpm for between about 8 to 10 minutes. During mixing, the three aqueous solutions, prepared above, are sprinkled onto the mixture. After the solutions have been added, mixing is continued for between about 3 to about 5 minutes.

The casing mixture is then ready to be used or packaged.

TABLE 2

SEDGE PEAT*

| Nutrient/Test | Optimum Range | Analytical Range at different depth |
| --- | --- | --- |
| Air Filled Porosity % | 15–25 | 2–10 |
| Water Holding Capacity % | >40 | 54–82 |
| pH | 0.5–7.2 | 3.6–4.4 |
| Electrical Conductivity | 0.2–0.5 | 0.08–0.12 |
| Chloride | 0–100 | 10–13 |
| Nitrate Nitrogen | 100–150 | 1–2 |
| Ammonium Nitrogen | 0–150 | 0.0 |
| Total Nitrogen | 150–250 | 1–2 |
| Sulphur | >40 | 1–8 |
| Phosphorus | 8–40 | 1–2 |
| Potassium | 35–250 | 2–4 |
| Calcium | 50–340 | 17–22 |
| Magnesium | 25–50 | 20–24 |
| Sodium | 0–70 | 18–23 |
| Iron | 35–70 | 52–72 |
| Copper | 0.4–10 | 0.04–0.15 |
| Manganese | 1.0–15 | 1–3 |

*The sedge peat is sourced from Butcher's Creek in Atherton. This peat contains high levels of minerals and a large percentage of undecomposed grasses, roots and the like which can tie up tree nitrogen. Further, this material can break down to a very fine particle size that can clog pore spaces.

TABLE 3

SUGARCANE MILL MUD

| Nutrient/Test | Analytical Range |
| --- | --- |
| Moisture Level % | 67.9–75.5 |
| Water holding capacity % | 46.9–62.3 |
| pH | 5.8–6.4 |
| Electrical conductivity | 0.54–0.77 |
| Total Nitrogen % dm | 0.52–0.83 |

TABLE 3-continued

SUGARCANE MILL MUD

| Nutrient/Test | Analytical Range |
| --- | --- |
| Ammonium Nitrogen ppm | 5–45 |
| Phosphorus % dm | 0.45–0.09 |
| Potassium % dm | 0.69–0.89 |
| Calcium % dm | 1.01–1.53 |
| Magnesium % dm | 0.37–0.43 |
| Sulfur % dm | 0.13–0.19 |

EXAMPLE 2

Example 1 was repeated with the sedge peat being replaced by coco peat. The coco peat has a composition according to Table 4.

TABLE 4

COCO PEAT

| Nutrient/Test | Optimum Range | Analytical Range at different depth |
| --- | --- | --- |
| Air Filled Porosity % | 15–25 | 13–18 |
| Water Holding Capacity % | >40 | 63–77 |
| pH | 6.5–7.2 | 6.1–6.4 |
| Electrical Conductivity | 0.2–0.5 | 0.29–0.31 |
| Chloride | 0–100 | 59–71 |
| Nitrate Nitrogen | 100–150 | 1–3 |
| Ammonium Nitrogen | 0–150 | >5 |
| Total Nitrogen | 150–250 | 1–3.5 |
| Sulphur | >40 | 2.9–6.3 |
| Phosphorus | 8–40 | 1–6 |
| Potassium | 35–250 | 132–166 |
| Calcium | 50–340 | 42–68 |
| Magnesium | 25–80 | 14–23 |
| Sodium | 0–70 | 53–57 |
| Iron | 35–70 | 10.1–24.6 |
| Copper | 0.4–10 | 4–7.6 |
| Manganese | 1.0–15 | 2.2–7.5 |

The composition of the casing soil prepared by Examples 1 and 2 has a composition according to Table 5. This mixture may also be used as a plant growth medium or as a soil additive.

TABLE 5

| Nutrient | Available limits of new casing mix |
| --- | --- |
| Air Filled Porosity % | 21–25 |
| Water Holding Capacity % | 70–72 |
| pH | 6.8–7.0 |
| Electrical Conductivity | 0.375–0.4 |
| Chloride (ppm) | 24–28 |
| Nitrate Nitrogen (ppm) | 110–125 |
| Ammonium Nitrogen (ppm) | 0.0 |
| Total Nitrogen (ppm) | 75–90 |
| Sulphur (ppm) | 30–60 |
| Phosphorus (ppm) | 25–35 |
| Potassium (ppm) | 20–30 |
| Calcium (ppm) | 225–300 |
| Magnesium (ppm) | 36–45 |
| Sodium (ppm) | 14–20 |
| Iron (ppm) | 42–45 |
| Copper (ppm) | 3.5–4.0 |
| Manganese (ppm) | 4–8 |

The casing soils prepared by Examples 1 and 2 are chemically balanced and ready to use. The texture of the material is able to maintain a ratio of carbon dioxide and oxygen which facilitates the initial growth of the mushroom mycelium. (Carbon dioxide is typically generated by the lower compost layer).

The casing soil prepared according to Examples 1 and 2 were observed to have a high carbon content (which is desirable for optimum vegetative growth), a low ash content (about 15 to about 25%), a high level of organic material (about 540 mg/kg), to be substantially nematode free, substantially free from soil borne pathogens have a moisture content of between about 45 to about 55% and a high moisture holding capacity (ie. a water holding capacity at dry bulb density of 0.4 m/cc at 0.4 m suction is 137% on a dry basis and 55% on a volumetric basis at temperature ranges of 15° C. to 32° C.).

The casing soil was also observed to maintain the moisture holding capacity at a minimum level of about 67 to about 72%, to maintain an optimum level of resistance against unwanted biological organisms during the cropping cycle, optimum nutrient levels, a pH of between about 6.7 to about 7.2 and also to maintain a desirable texture.

The growth and quality of mushrooms produced using the composition of the present invention was compared with the growth and quality of mushrooms produced using sphagnum peat. The quality and quality of the mushrooms produced using the composition of the present invention was found to be comparable to that using sphagnum peat. Comparative tests in which sedge peat and sugarcane mill mud were used on their own showed that the mushroom growth was unsatisfactory.

EXAMPLE 3

A potting mix was prepared by mixing 1.7 parts by weight sedge peat to 1 part by weight sugar mill mud. To this mix was added 4 parts by weight bagasse.

EXAMPLE 4

A top dressing material was prepared according to Example 3 except that 2 parts by weight bagasse was added. The top dressing material was spread on a ground surface. Grass seeds were spread on the material at regular intervals. Grass germination and growth was evident over a period of about one week. This time was observed to be less than that when using conventional top dressing materials.

The potting mix and top dressing material were also observed to exhibit at least equivalent and generally superior results over conventional materials. However, the medium of the present invention can be prepared using waste products such as sugar cane mill mud. Thus, the medium can replace conventional materials currently prepared from limited natural resources.

It will be appreciated that in the present specification and claims, the term "comprising" and its derivatives "comprise" and "comprises" will imply the inclusion of the stated integers but not the exclusion of any further integer or integers.

It can be seen that the composition of the present invention provides an alternative to conventional sphagnum peat in the production of mushrooms and use as a plant growth medium or soil additive. The composition enables the production of mushrooms of a quality and quantity comparable to sphagnum peat.

What is claimed is:

1. A method of preparing a casing soil composition comprising mixing about 6.25 parts by weight sedge peat or coconut fibre with about 3.75 parts by weight sugar can mill mud, adjusting the pH to between about 6.7 to about 7.2 and adding water to adjust the moisture content to about 75%.

2. A potting mix comprising about 1.7 parts by weight sedge peat, about 1 part by weight sugar can mill mud and about 4 parts by weight bagasse.

3. A top dressing material comprising about 1.7 parts by weight sedge peat, about 1 part by weight sugar cane mill mud and about 2 parts by weight bagasse.

4. A growth medium for plants, the medium comprising sugar cane mill mud and a non sphagnum-peat, the medium having a composition including chloride present in the range of from 18 ppm to 30 ppm, nitrate nitrogen present in the range of from 100 ppm to 150 ppm, ammonium nitrogen present in an amount greater than 50 ppm, total nitrogen present in the range of from 60 ppm to 100 ppm, sulphur present in the range of from 25 ppm to 50 ppm, phosphorus present in the range of from 18 ppm to 40 ppm, potassium present in the range of from 16 ppm to 30 ppm, calcium present in the range of from 150 ppm to 350 ppm, magnesium present in the range of from 30 ppm to 60 ppm, sodium present in the range of from 5 ppm to 20 ppm, iron present in range of from 25 ppm to 50 ppm, copper present in the range of from 1.0 ppm to 4.5 ppm, manganese present in the range of from 2 ppm to 7 ppm, and wherein the medium has an air filled porosity in the range of from 17% to 25%, a water holding capacity in the range of from 67% to 74%, a pH in the range of from 6.7 to 7.2 and an electrical conductivity in the range of from 0.3 to 0.45.

\* \* \* \* \*